May 4, 1926.

W. P. MARR

ELECTRIC WIRE CONNECTER

Filed March 3, 1923

1,583,479

Inventor
William P. Marr
by H. S. Dennison
Atty.

Patented May 4, 1926.

1,583,479

UNITED STATES PATENT OFFICE.

WILLIAM P. MARR, OF TORONTO, ONTARIO, CANADA.

ELECTRIC-WIRE CONNECTER.

Application filed March 3, 1923. Serial No. 622,554.

*To all whom it may concern:*

Be it known that I, WILLIAM PATERSON MARR, a subject of the King of Great Britain, and resident of the city of Toronto, county of York, Province of Ontario, in the Dominion of Canada, have invented certain new and useful Improvements in an Electric-Wire Connecter, described in the following specification and illustrated in the accompanying drawings that form part of the same.

The objects of this invention are to eliminate the detrimental conditions incident to the joining of electric wires, particularly in the asssembling of electric fixtures and to provide a mechanical connecter which will hold the wires securely and thoroughly insulated without the use of heat or of tape.

The principal feature of the invention consists in providing a tubular member closed at one end to receive and rigidly hold the wire ends and to provide a tubular insulating enclosure for the aforesaid tube.

Figure 1:
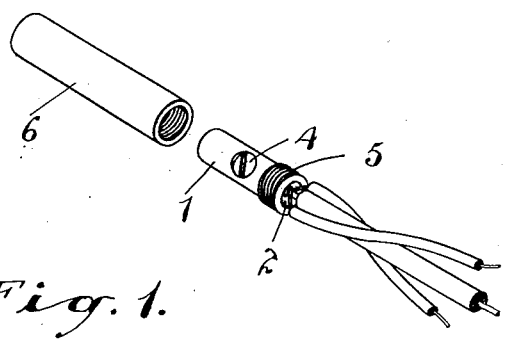

In the drawings, Figure 1 is a perspective view of the inner connecting member arranged upon the wire ends connected and the outer insulating member separated therefrom.

Figure 2:
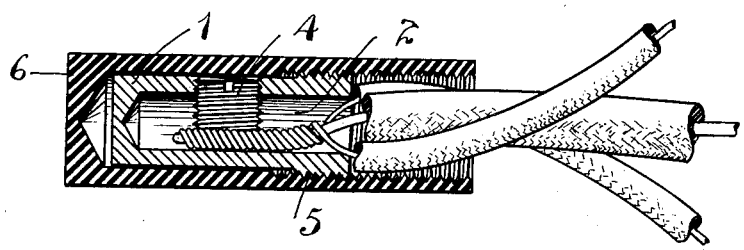

Figure 2 is an enlarged longitudinal sectional view of the assembled device.

It is well known to electricians that the wiring of fixtures is extremely difficult owing to the closeness of walls, ceilings and expensive decorations which are very easily marred by the spattering of solder flux or by smoke in the soldering of the joints. Further, it is frequently very difficult to properly tape a jointed end.

Wire connecters of various kinds have been proposed for fastening the adjacent ends of wires together but these have been mostly of the type wherein a continuous connection was desired, that is, with a wire running through. In fixture work it is common practice to lay the flexible wires alongside the permanent and twist them together after which they are soldered and taped.

The present invention comprises a tubular member 1 closed at one end, the bore 2 being sufficiently large to receive any desirable number of wire ends. The wire ends inserted into the tubular member are secured in place by a grub screw 4, the lesser diameter of which corresponds with the diameter of the longitudinal bore so that the screw obtains support for a considerable depth and is not just dependent upon threads in the thickness of the tubular material.

The member 1 is machined with a thread 5 on its external surface at the open end. The wire ends are securely twisted together and inserted into the tubular member 1 and clamped securely therein, making perfect contact by means of the screw 4.

A tubular member 6 in the form of a cylinder having an internal threaded surface is adapted to extend over and enclose the tubular member 1. This sleeve member is sufficiently long to extend well up upon the insulation of the wires completely covering over the tubular metal member 1 and also completely insulating the wires.

In the use of this device, the electrician merely bares and twists his wire ends together. He then caps them with a sleeve 1 which he rigidly secures in place by means of the grub screw, which on account of its long thread bearing may be tightened very securely without danger of stripping. The outer insulating tubular enclosure is then threaded on to the metallic cap and the job is completed.

The operation is thus extremely simple and inexpensive and therefore is extremely desirable.

What I claim as my invention is:—

An electric wire connecter, comprising, a tubular metal member capable of receiving a multiplicity of wire ends, a metal screw entering said member transversely and extending completely across the diameter of the bore thereof and adapted to clamp the wire ends securely together and against the wall of said tubular member, and a separable closed tubular insulating member fitted over the metal tube and completely enclosing the perimeter of said tube and said screw.

WILLIAM P. MARR.